May 12, 1959 C. E. LOMAX 2,886,641

RECORDED MESSAGE SERVICE FOR TELEPHONE PAYSTATIONS

Filed Oct. 6, 1954 2 Sheets-Sheet 1

INVENTOR.
CLARENCE E. LOMAX
BY [signature]
ATTY

RECORDED MESSAGE SERVICE FOR TELEPHONE PAYSTATIONS

Filed Oct. 6, 1954 2 Sheets-Sheet 2

INVENTOR.
CLARENCE E. LOMAX
BY [signature]
ATTY.

2,886,641
Patented May 12, 1959

2,886,641

RECORDED MESSAGE SERVICE FOR TELEPHONE PAYSTATIONS

Clarence E. Lomax, Chicago, Ill., assignor to General Telephone Laboratories, Incorporated, a corporation of Delaware Application October 6, 1954, Serial No. 460,730

6 Claims. (Cl. 179—6.3)

The present invention relates to measured service telephone systems in general, and more particularly to improved circuits for use with paystations.

It is an object of this invention to provide means for connecting a voice message to a connection extended from a paystation immediately after the call is answered to inform the called party that the call originates at a paystation.

It is another object of this invention to provide a voice signal to the answering telephone when the transmitted of the paystation is disabled, and to provide another signal to identify the call as a paystation call when the transmitter of the paystation is not disabled.

This arrangement is particularly useful with post pay paystations in which the paystation transmitter is disabled when the call is answered and remains disabled until a coin is deposited in the paystation. Such a post pay paystation is shown in Patent 1,214,969 issued February 6, 1917 to S. S. Stolp. In calls from a paystation of this type the called party does not get an immediate response from the calling party and if there is an unduly long delay before the coin is deposited the called party may abandon the connection. However, the voice transmitted immediately after the call is answered informs the called party of the nature of the call and also serves as a reminder to the calling party to deposit the necessary coin.

In the accompanying drawing are shown only such circuits of a local automatic telephone system and an operator's position as are considered necessary to clearly illustrate the invention.

Figure 1:
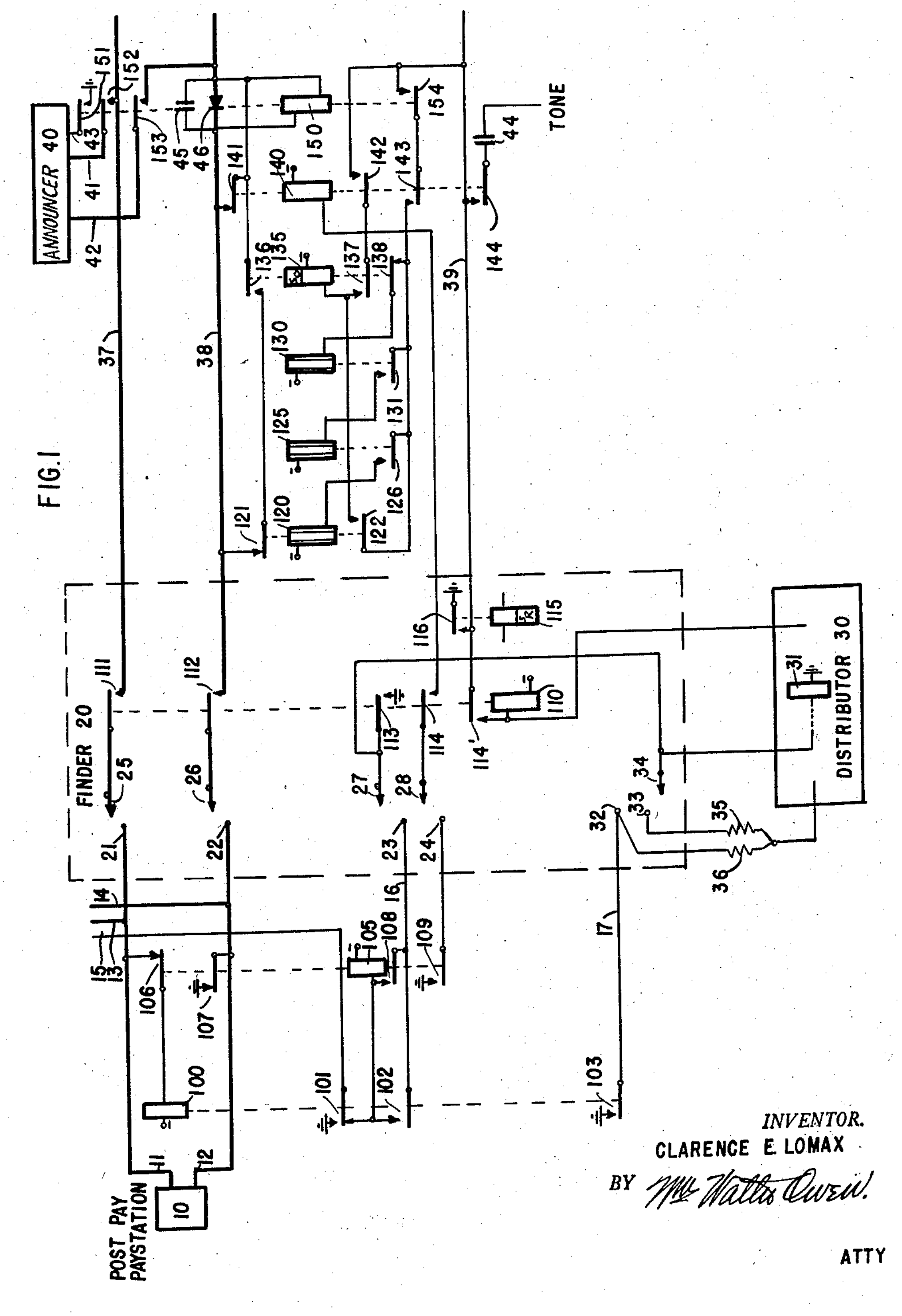
Fig. 1 shows a paystation 10 which is provided with the usual instrumentalities including a dial and coin collect mechanism as shown in Stolp Patent 1,214,969. The finders are of the well known Strowger type and the relay equipment on the right side of the drawings is designed particularly to connect the message announcer 40 to the line when the call is answered.
Figure 2:
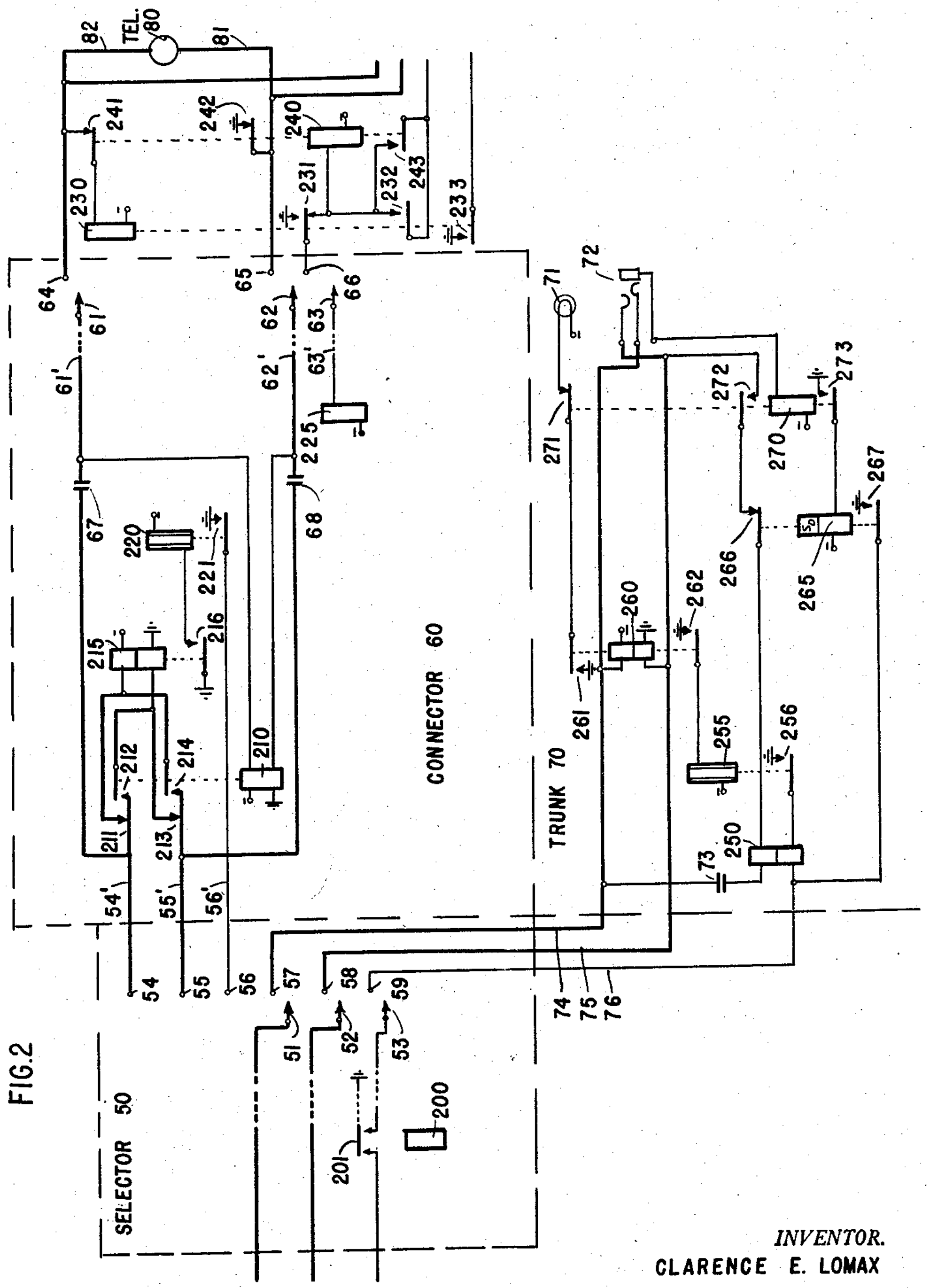
Fig. 2 shows a selector of the well known Strowger type which has access to connectors of the well known Strowger type and also to an operator's position.

When a call is originated by the post pay paystation 10 the relay 100 is energized from battery through its winding, armature 106, conductor 11, paystation 10, conductor 12, and armature 107 to ground. Relay 100 operates, connects ground through armature 101 to conductor 15 to make the paystation busy to connectors, such as the connector 60, connects battery through the coil of relay 105 through armature 102 to bank contact 23 to mark the calling condition in the finder banks, and at armature 103 connects ground to bank contact 32 and through resistor 36 to distributor 30 to start a finder.

The finder 20 is one of a group of similar finders having access to paystation 10. The distributor 30 selects an idle individual one of the finders and in response to ground through a resistor, such as resistor 36, causes the selected finder to hunt for a calling line. Assume now that the finder 20 has been selected for operation by the distributor 30.

Ground from armature 103 through resistor 36 causes distributor 30 to start finder 20 and causes it to hunt for the calling line. The finder 20 first moves its wiper 34 over bank contacts such as 33 and 32. In this case ground on bank contact 32 causes finder 20 to rotate its wipers 25, 26, 27 and 28 into engagement with bank contacts 21, 22, 23 and 24 respectively, and at the same time disengage wiper 34 from bank contact 32. Battery through relay 105, armature 102, bank contact 23, and wiper 27 is connected to the distributor 30, to cause the distributor to stop the hunting action of the finder 20 and operate the relay 110 to connect the paystation 10 through to selector 50 by way of armatures 111 and 112. Relay 105 is energized by ground from armature 113 and on operating closes a holding circuit for itself at armature 108, opens the circuit to relay 100 at armatures 106 and 107 and connects ground through armature 109, bank contact 24, wiper 28 and armature 114 to the winding of relay 140. Relay 100 restores and disconnects ground from resistor 36 and distributor 30. The relay 140 operates and at armature 141 removes a short circuit from the winding of relay 150, the rectifier 46 and the condenser 45. The rectifier 46 offers low resistance to the potential connected in the selector 50 and the relay 150 does not operate at this time. The relay 140 closes its other armatures which perform no function at this time.

The selector 50 is preferably of the well known Strowger type and responds to a dialed digit to position its wipers adjacent the level of contacts corresponding to the dialed number. During the interval between digits the selector 50 operates automatically to select an idle line in the level. Assume that the selector 50 has been operated to the level in which bank contacts 54, 55 and 56 are located and has operated its wipers 51, 52 and 53 to engage bank contacts 54, 55 and 56 respectively thus making connection to the connector 60. The relay 200 in the selector 50 is operated at this time and at armature 201 connects wiper 53 to armature 114' and to the winding of the relay 110.

Connector 60 is preferably of the well known Strowger type which responds to dial operation to connect with telephones such as telephone 80. When connector 60 is seized the relay 215 is energized in series with the paystation 10 over a circuit which extends from battery through the upper winding of relay 215, contact 211, conductor 54', bank contact 54, wiper 51, conductor 37, armature 111, wiper 25, bank contact 21, conductor 11, paystation 10, conductor 12, bank contact 22, wiper 26, armature 112, conductor 38, rectifier 46 and the winding of relay 150 in multiple, wiper 52, bank contact 55, conductor 55', contact 213 and the lower winding of relay 215 to ground. Relay 215 operates and at armature 216 energizes relay 220. Relay 220 operates and connects ground through armature 221, conductor 56', bank contact 56 to wiper 53 and over a previously traced circuit to the winding of relay 110 to hold the switching equipment operated.

Assume now that the connector 60 is operated in a well known manner by subsequent dialling so that wipers 61, 62 and 63 connect with bank contacts 64, 65 and 66 respectively. The telephone 80 is signalled in well known manner and when the receiver is removed at the telephone 80 the relay 210 is energized from battery through its upper winding, conductor 61', wiper 61, bank contact 64, conductor 82, telephone 80, conductor 81, bank contact 65, wiper 62, conductor 62' and the lower winding of the relay 210 to ground. The relay 210 operates and at armatures 212 and 214 reverses the connection of the winding of the relay 215 in respect to the conductors 54' and 55' and thus reverses the direction of the current flow through the paystation 10 and through the rectifier 46 and the winding of the relay 150. The relays 225 and 240 are operated by ground (not shown) in the connector 60 connected to the conductor 63'. This ground is connected as soon as it is determined that the telephone 80 is not busy and is maintained as long as the connection is held. The relay 240 disconnects the relay 230 from the line at armature 241 and disconnects ground from the line at armature 242.

Reversal of battery at paystation 10 disables the transmitter at the paystation and requires the deposit of a coin to permit conversation to take place. The reversal of battery to relay 150 operates relay 150 which at armature 151 connects ground to the message announcer 40 to start it in operation and at armatures 152 and 153 connects it to the paystation 10 and the telephone 80. Ground from armature 221 over a previously traced circuit is connected through armatures 154, 143 and 138 to operate relay 130. Relay 130 at armature 131 energizes relay 125. Relay 125 operates and at armature 126 energizes relay 120. Relay 120 operates, disconnects armature 121 from conductor 38 and at armature 122 energizes relay 135. Relay 135 operates and at armature 136 connects one terminal of the rectifier 46 and the relay 150 to armature 121, closes a holding circuit to itself at armature 137 and opens the circuit to relay 130 at armature 138. Relays 130, 125 and 120 are of the well known slow to release type. Shortly after its circuit is opened relay 130 releases and opens the circuit to relay 125 which in turn releases and opens the circuit to relay 120. Relay 120 on releasing short circuits relay 150 and rectifier 46 thus causing relay 150 to release and disconnect the recorder 40 from the line.

The message announcer 40 may be of any conventional type such, for example, as shown in Patent 1,958,896 issued May 5, 1934 to I. L. Lesavoy et al. but is preferably like the multi-channel message announcer shown in the application of E. S. Peterson filed October 6, 1954, Serial No. 460,663. While the relay 150 is operated the message recorder 40 repeats a message to the line announcing that the call originated at a paystation, advising the calling party to deposit a coin and advising the called party to wait until the deposit of the coin is made. The slow release of relays 130, 125 and 120 is arranged to provide an interval suitable for the repetition of such a message.

After the coin is deposited the transmitter at the paystation 10 becomes effective and conversation is carried on in the usual manner. When the receivers are replaced at the telephones, ground is disconnected from the holding conductors 16, 39, 56' and 63' and the equipment restores to normal.

Assume that the selector 50 is operated to the level that includes bank contacts 57, 58 and 59 and that the wipers 51, 52 and 53 have been operated into contact with bank contacts 57, 58 and 59 respectively. Relay 260 is operated in series with the paystation 10 and energizes relay 255 which at armature 256 connects ground through the lower winding of induction coil 250 over conductor 76 through bank contact 59, wiper 53, armature 201 to conductor 39 to hold the connection. At armature 261 the circuit to lamp 71 is closed to signal the operator. A tone through condenser 44, and armature 144 is connected to conductor 39 and flows through the lower winding of the induction coil 250. When the operator answers by inserting a plug in jack 72 relay 270 operates, opening the circuit to the lamp 71 at armature 271 and connecting the upper winding of the induction coil 250 to conductor 75. Tone in the lower winding of induction coil 250 induces a similar tone in the upper winding which is supplied to the operator through condenser 73 to indicate that the calling station is a paystation. The relay 270 on operating also energizes relay 265. Relay 265 is slow to operate and remains normal long enough for the operator to hear the paystation tone. When relay 265 operates it disconnects the upper winding of induction coil 250 from the line at armature 266 and short circuits the lower winding of the induction coil at armature 267, thus cutting off the tone.

It may be noted that battery is not reversed when the operator answers and therefore the relay 150 does not operate. The tone signal supplied to the operator advises the operator that the call is from a paystation and the operator requires the deposit of a coin or coins before completing the connection.

When the receiver is replaced at the paystation and the operator disconnects, the equipment releases in the usual manner.

Having described the invention, what is considered to be new and is desired to be protected by Letters Patent is set forth in the following claims.

What is claimed is:

1. In a telephone system, a calling paystation, a called telephone, switching equipment, means for operating said switching equipment to extend a call from said paystation to said called telephone, a message announcer associated with said switching equipment and normally disconnected therefrom for identifying said call as originating at said calling paystation, means effective in response to the answering of the call at the called telephone for connecting said message announcer to said called telephone, and a timer operated responsive to the answering of the call for disconnecting said message announcer from said called telephone.

2. In a telephone system, a calling paystation, a called telephone, switching equipment, means for operating said switching equipment to extend a call from said paystation to said called telephone, a relay in said switching equipment, means for operating said relay responsive to the answering of said call by said telephone, a message announcer associated with said switching equipment and normally disconnected therefrom for identifying said call as originating at said calling paystation, certain contacts controlled by said relay for connecting said announcer to said called telephone responsive to the operation of said relay, a timer in said switching equipment, a different contact controlled by said relay for starting the operation of said timer responsive to the operation of said relay, and means controlled responsive to the operation of said timer for releasing said relay to disconnect said annuouncer from said called telephone.

3. In a telephone system, a called telephone, an operator's position, a calling paystation, switching equipment, means for operating said switching equipment under control of said calling paystation to extend a connection from said paystation to said called telephone in one instance and to said operator's position in another instance, a voice message announcer associated with said switching equipment and normally disconnected therefrom for identifying a call as originating at a paystation, means operated in said one instance for connecting said voice message announcer to a connection extended to said called telephone responsive to answering thereat, a tone source other than said message announcer for identifying a call as originating at a paystation, and means operated in said other instance for connecting said tone source to a connection extended to said operator's position.

4. In a telephone system, a calling paystation, switching equipment, a called telephone, means for operating said switching equipment to extend a connection from said paystation to said called telephone, an operator's position, means for operating said switching equipment to extend a connection from said paystation to said operator's position, a plurality of paystation identification means, means for connecting one of said paystation identification means to a connection to identify the call as originating at a paystation in case the connection is extended to said called telephone, and means for connecting a different one of said paystation identification means to a connection to identify the call as originating at a paystation, in case the connection is extended to said operator's position.

5. In a telephone system in which reversal of battery responsive to the answering of a connection originated at a calling paystation disables the talking circuit at the paystation, a voice message announcer for identifying the connection as originating at said paystation, means responsive to the reversal of battery when a connection originated at said paystation is answered for connecting said voice message announcer to said connection, and means responsive to reversal of battery when a connection originated at said paystation is answered for disconnecting said voice message announcer from said connection a predetermined time after the reversal of battery.

6. In a telephone system, a calling paystation, a trunk circuit, means including said trunk circuit for extending calls of two different classes from said paystation, a message announcer effective only with one class of call, a tone effective only with the other class of call, a relay in said trunk circuit, means for operating said relay in the course of extending a call from said paystation, certain contacts operated by said relay for preparing the connection of said announcer to said trunk, other contacts operated by said relay for connecting said tone to said trunk, means operated responsive to the answering of one class of call extended from said calling paystation for completing the connection of said announcer to said trunk to identify said call as originating at said calling paystation, and means operated responsive to the answering of the other class of call extended from said calling paystation to render said tone effective for identifying said call as originating at said calling paystation.

References Cited in the file of this patent

UNITED STATES PATENTS

| | | |
|---|---|---|
| 2,191,612 | Findley | Feb. 27, 1940 |
| 2,217,041 | Boswau | Oct. 8, 1940 |
| 2,729,703 | Faulkner et al. | Jan. 3, 1946 |
| 2,743,315 | Van Deventer et al. | Apr. 24, 1956 |